(12) United States Patent
Hotta et al.

(10) Patent No.: US 9,290,148 B2
(45) Date of Patent: Mar. 22, 2016

(54) AIRBAG APPARATUS

(71) Applicant: TOYODA GOSEI CO., LTD., Kiyosu-shi, Aichi-ken (JP)

(72) Inventors: Masashi Hotta, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/621,746

(22) Filed: Feb. 13, 2015

(65) Prior Publication Data

US 2015/0239418 A1    Aug. 27, 2015

(30) Foreign Application Priority Data

Feb. 24, 2014 (JP) ................................. 2014-032517

(51) Int. Cl.
| | | |
|---|---|---|
| *B60R 21/215* | (2011.01) | |
| *B60R 21/207* | (2006.01) | |
| *B60R 21/217* | (2011.01) | |

(52) U.S. Cl.
CPC ........... *B60R 21/2171* (2013.01); *B60R 21/207* (2013.01); *B60R 21/215* (2013.01); *B60R 2021/21525* (2013.01)

(58) Field of Classification Search
CPC B60R 21/2171; B60R 21/207; B60R 21/215; B60R 2021/21525
See application file for complete search history.

(56) References Cited

U.S. PATENT DOCUMENTS

| | | | | |
|---|---|---|---|---|
| 5,791,685 | A * | 8/1998 | Lachat | B60R 21/23138 280/729 |
| 6,270,113 | B1 * | 8/2001 | Wipasuramonton | B60R 21/23138 280/728.1 |
| 7,226,077 | B2 * | 6/2007 | Abe | B60R 21/206 280/728.1 |
| 7,396,042 | B2 * | 7/2008 | Mabuchi | B60R 21/2171 280/730.2 |
| 9,010,804 | B2 * | 4/2015 | Witt, Jr. | B60R 21/2338 280/743.2 |
| 9,180,833 | B2 * | 11/2015 | Jo | B60R 21/231 |
| 2005/0052009 | A1 | 3/2005 | Abe | |
| 2006/0108777 | A1 | 5/2006 | Mabuchi et al. | |
| 2007/0085305 | A1 * | 4/2007 | Feller | B60R 21/231 280/728.2 |
| 2008/0116669 | A1 | 5/2008 | Adachi et al. | |
| 2010/0096841 | A1 | 4/2010 | Tanaka et al. | |

FOREIGN PATENT DOCUMENTS

| | | |
|---|---|---|
| JP | 2005-082025 A | 3/2005 |
| JP | 2006-076392 A | 3/2006 |
| JP | 2008-120290 A | 5/2008 |
| JP | 2010-095216 A | 4/2010 |
| JP | 2013-086731 A | 5/2013 |

* cited by examiner

*Primary Examiner* — Drew Brown
(74) *Attorney, Agent, or Firm* — Posz Law Group, PLC

(57) ABSTRACT

A section of an inflator from a longitudinally middle portion to a gas outlet is defined as an insertion section. The insertion section is inserted in an airbag through an insertion opening and is arranged along the inner wall surface of the airbag. The inflator includes a proximal end located opposite to the gas outlet. The section of the inflator from the middle portion to the proximal end, that is, an exposed section is located outside the airbag and is arranged along the outer wall surface of the airbag. A lid sheet inside the airbag closes a gap between an inner edge of the insertion opening and the inflator from a position inward of the insertion section. The lid sheet includes a joint located along the rear portion of the insertion opening in the insertion direction of the inflator. The lid sheet is joined to the airbag with the joint.

7 Claims, 9 Drawing Sheets

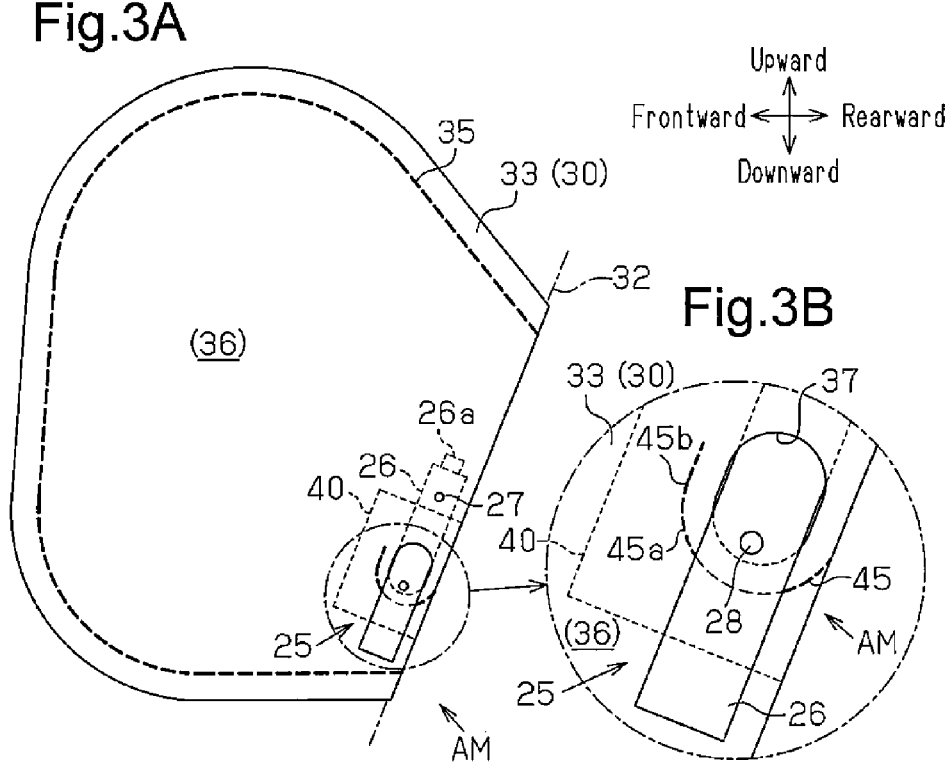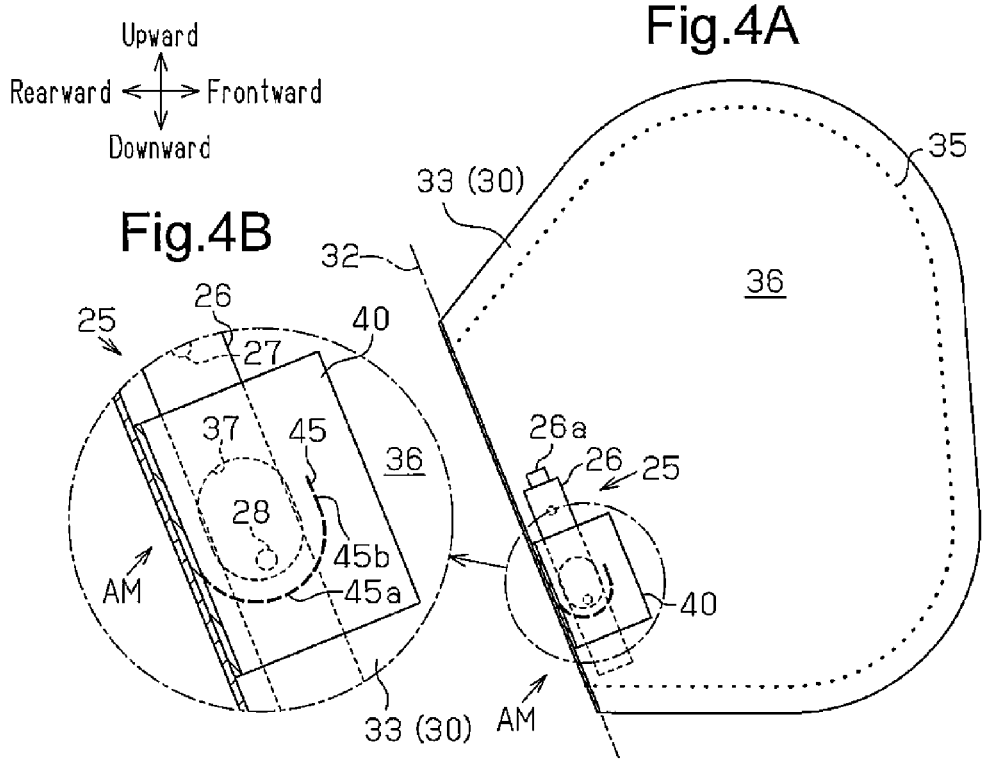

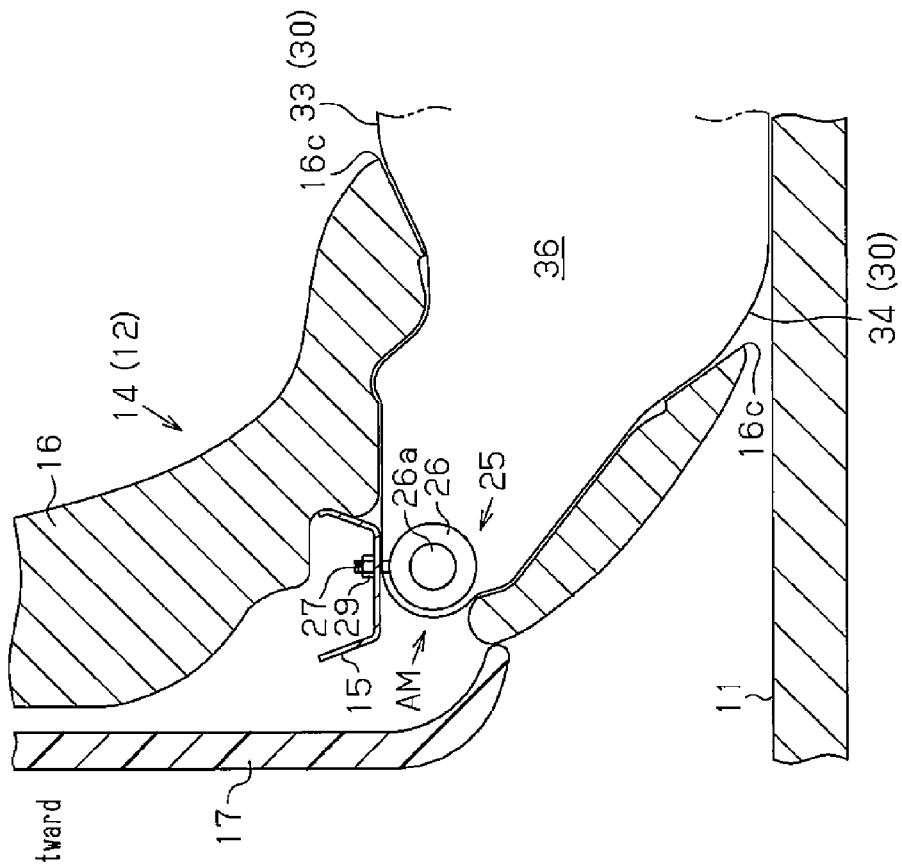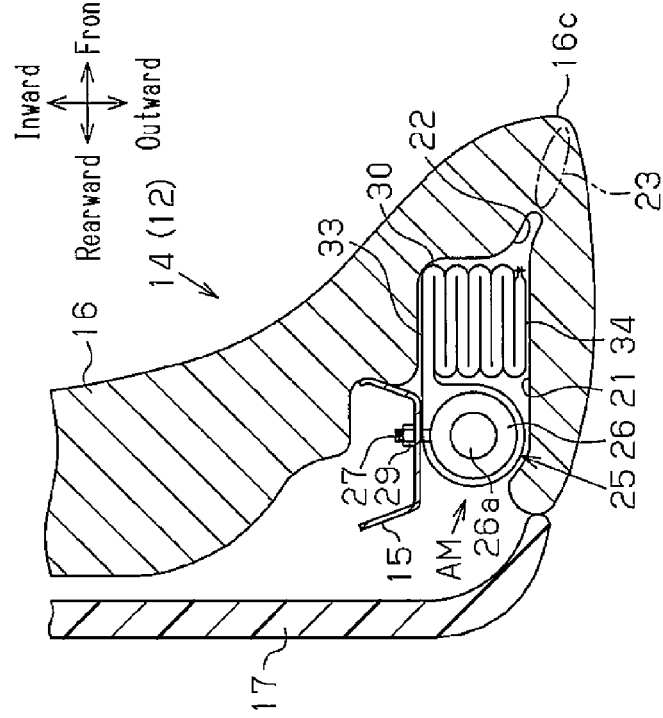

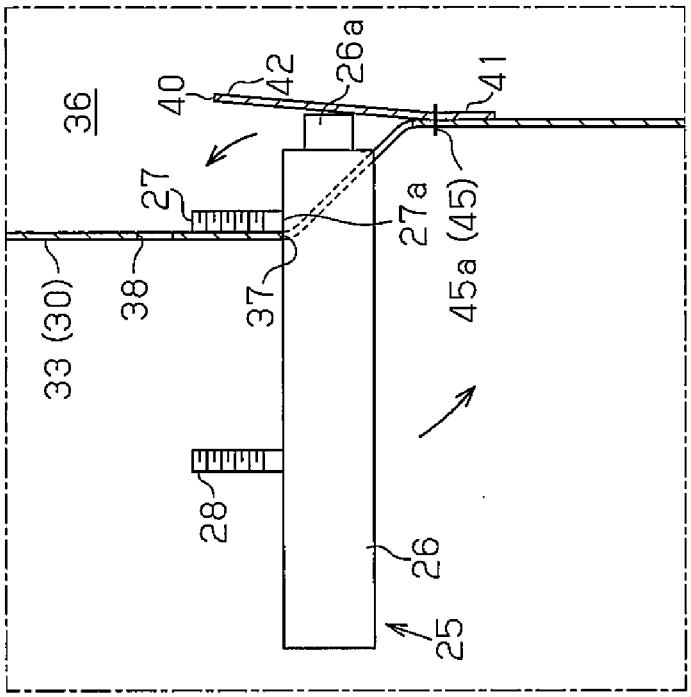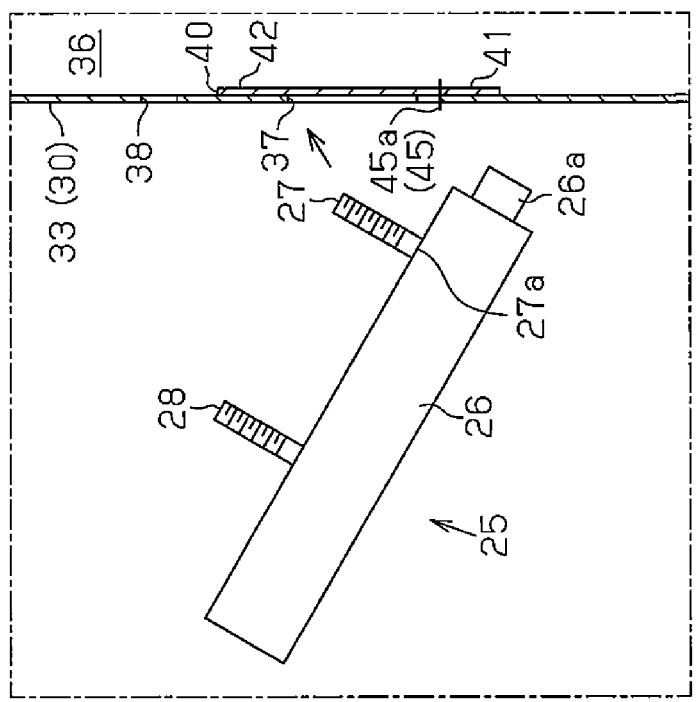

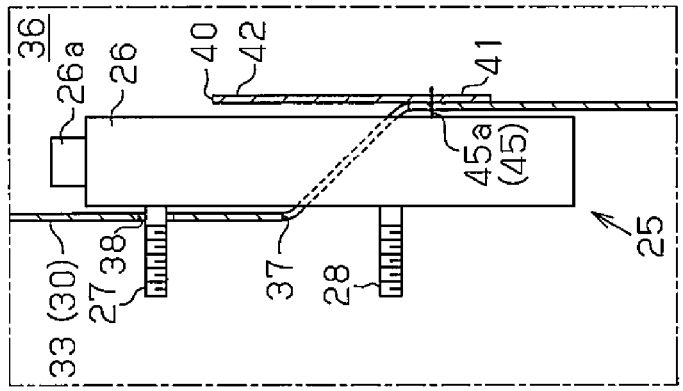
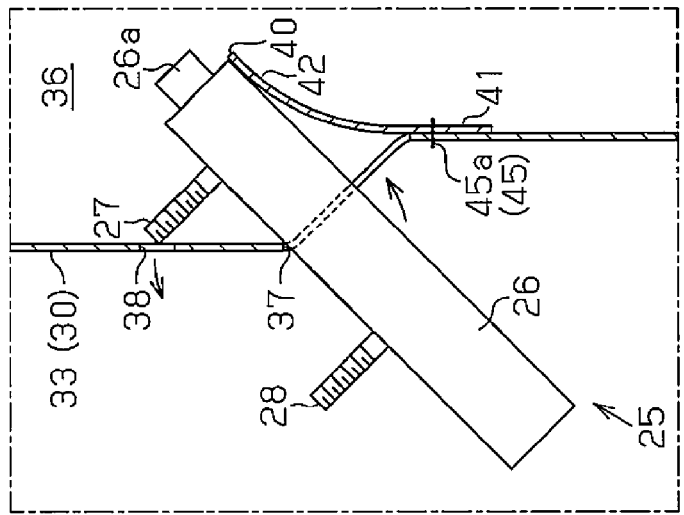
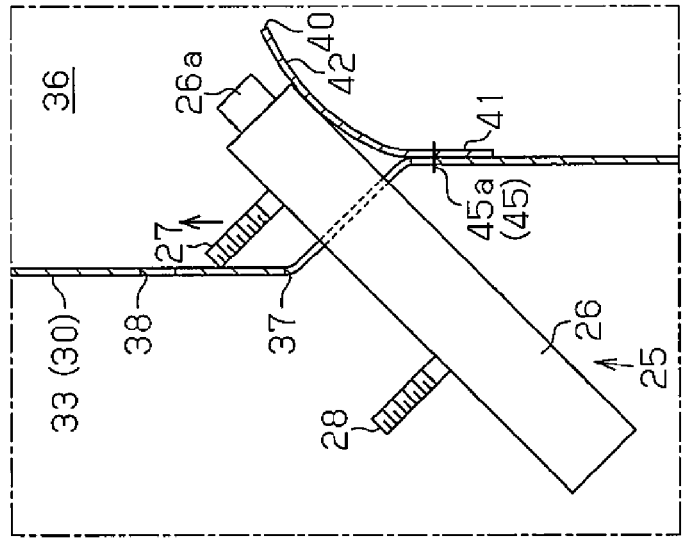

AIRBAG APPARATUS

BACKGROUND OF THE INVENTION

The present invention relates to an airbag apparatus that protects an occupant from an impact by deploying and inflating an airbag at a position close to the occupant seated in a vehicle seat when an impact due to, for example, a collision is applied to the vehicle.

An airbag apparatus is known to be effective for protecting an occupant from an impact when an impact due to, for example, a collision is applied to an automobile. Airbag apparatuses typically generate inflation gas from a gas generator and deploy and inflate an airbag with the inflation gas at a position close to an occupant to reduce an impact.

One form of the gas generator includes an elongated or cylindrical gas generator having a gas outlet at one end. In an airbag apparatus that uses such a gas generator, a part of the gas generator from a longitudinally middle portion to the gas outlet is inserted inside the airbag through insertion openings of the airbag and along the inner wall surface of the airbag (for example, see Japanese Laid-Open Patent Publication No. 2013-86731). In such an airbag apparatus, a part of the gas generator from the middle portion to the proximal end is located outside the airbag and close to the outer wall surface of the airbag.

Furthermore, the airbag apparatus disclosed in Japanese Laid-Open Patent Publication No. 2013-86731 includes the airbag formed by laying a first base fabric sheet having an insertion opening over a second base fabric sheet having an insertion opening. The insertion opening of the first base fabric sheet is elliptical and has a major axis extending in the longitudinal direction of the gas generator. The insertion opening of the second base fabric sheet is circular and has a diameter shorter than the major axis of the insertion opening of the first base fabric sheet. The insertion opening of the second base fabric sheet is located inward of the insertion opening of the first base fabric sheet and forward of the insertion direction of the gas generator.

With the above structure, part of the airbag where the insertion opening of the first base fabric sheet does not lie over the insertion opening of the second base fabric sheet forms a low rigidity portion, which includes only the second base fabric sheet. The low rigidity portion is softer than the surrounding portion having a double-layer structure. Thus, the low rigidity portion reduces impact load applied to the gas generator when the airbag is deployed and inflated. The low rigidity portion also permits the insertion section of the gas generator to be easily inserted into the airbag through the insertion openings.

Furthermore, in addition to the apparatus disclosed in Japanese Laid-Open Patent Publication No. 2013-86731, various airbag apparatuses have been proposed that include an airbag with the double-layer structure, which is formed by laying a first base fabric sheet having an insertion opening over a second base fabric sheet having an insertion opening, and is formed such that a gas generator is inserted in the airbag through the insertion openings. For example, airbag apparatuses disclosed in Japanese Laid-Open Patent Publications No. 2008-120290 and No. 2010-95216 include a slack or a slit at the portion surrounding the insertion opening of the second base fabric sheet. When the insertion opening of the second base fabric sheet is tensioned as the airbag is deployed and inflated, the slack or the slit restrains increase in the gap between the inner edge of the insertion opening and the gas generator and thus restrain leakage of the inflation gas through the insertion portion of the airbag for the gas generator.

All the airbag apparatuses disclosed in Japanese Laid-Open Patent Publications No. 2013-86731, No. 2008-120290, and No. 2010-95216 include a first base fabric sheet and a second base fabric sheet each having an insertion opening into which a gas generator is inserted. Thus, a measurable gap is formed between the gas generator and the inner edges of the insertion openings. Although the airbags of all the airbag apparatuses disclosed in the above publications employ a double-layer structure to restrain leakage of the inflation gas through the gap as compared to a case in which the double-layer structure is not employed, the leakage restraint effect is insufficient, and there is room for improvement.

SUMMARY OF THE INVENTION

Accordingly, it is an objective of the present invention to provide an airbag apparatus that is capable of further restraining leakage of inflation gas through an insertion portion in an airbag for a gas generator.

To achieve the foregoing objective, an airbag apparatus includes a gas generator and an airbag. The gas generator is elongated and includes a gas outlet at a distal end. The airbag is deployed and inflated by inflation gas discharged from the gas outlet. The airbag includes an insertion opening for the gas generator. A section of the gas generator from a longitudinally middle portion to the gas outlet is defined as an insertion section. The insertion section is inserted in the airbag through the insertion opening and is arranged along an inner wall surface of the airbag. The gas generator has a proximal end located opposite from the gas outlet. A section from the middle portion to the proximal end is located outside the airbag and along an outer wall surface of the airbag. The airbag includes a lid sheet arranged inside the airbag. A gap is defined between the gas generator and an inner edge of the insertion opening. The lid sheet closes the gap from a position inward of the insertion section. The lid sheet includes a joint. The joint is located along a rear portion of the insertion opening in an insertion direction of the gas generator. The lid sheet is joined to the airbag with the joint.

In the airbag apparatus configured as described above, the gas generator is inserted through the insertion opening along the inner wall surface of the airbag up to the longitudinally middle portion of the gas generator. Part of the gas generator from the middle portion to the gas outlet, that is, the insertion section is located inside the airbag. Part of the gas generator from the middle portion to the proximal end is located at a position outside the airbag close to the outer wall surface of the airbag.

When the airbag apparatus is activated and inflation gas is discharged from the gas outlet so that the airbag is deployed and inflated, the airbag pulls the insertion opening and acts to increase the gap between the inner edge of the insertion opening and the gas generator.

However, the lid sheet arranged in the airbag and joined to the airbag with the joint restricts the gap from increasing by deformation of the insertion opening, which is pulled when the airbag is deployed and inflated.

At this time, the lid sheet also closes the gap from the position inward of the insertion section. Furthermore, in a case in which pressure of inflation gas flowing from inside to outside the airbag, or internal pressure, is applied to the lid sheet, the lid sheet is pressed against the insertion section and the airbag.

This restrains leakage of the inflation gas through the insertion portion in the airbag for the gas generator.

BRIEF DESCRIPTION OF THE DRAWINGS

FIG. 3A is a side view illustrating the airbag module in a state as viewed from the inner side of the automobile;

FIG. 3B is an enlarged partial side view illustrating a part of FIG. 3A;

FIG. 4A is a cross-sectional side view illustrating the internal structure of the airbag module in a state as viewed from the outer side of the automobile;

FIG. 4B is an enlarged partial cross-sectional side view illustrating a part of FIG. 4A;

FIG. 5A is a partial cross-sectional plan view illustrating the internal structure of a side portion of the seat back in which the airbag module is installed;

FIG. 5B is a partial cross-sectional plan view illustrating a state in which the airbag of FIG. 5A is deployed and inflated;

FIGS. 10A and 10B are explanatory partial cross-sectional views showing the manner in which the insertion section of the gas generator is inserted in the airbag through the insertion opening and is secured to the airbag;

FIGS. 11A to 11C are explanatory partial cross-sectional views also showing the manner in which the insertion section of the gas generator is inserted in the airbag through the insertion opening and is secured to the airbag;

DETAILED DESCRIPTION OF THE PREFERRED EMBODIMENT

An airbag apparatus according to one embodiment will now be described with reference to FIGS. 1 to 11. In this embodiment, the airbag apparatus is employed as a side airbag apparatus for an automobile.

In the following, the direction in which an automobile advances forward will be referred to as the front, and reverse direction will be referred to as the rear. The middle of the widthwise direction of the automobile is used as reference in the widthwise direction of the automobile. A side closer to the middle of the widthwise direction will be referred to as "inner side" of the automobile, while a side farther from the middle of the widthwise direction will be referred to "outer side" of the automobile.

An average sized adult is seated on an automobile seat in a predetermined posture (normal posture). An occupant is defined as an adult having an average size.

Figure 1:
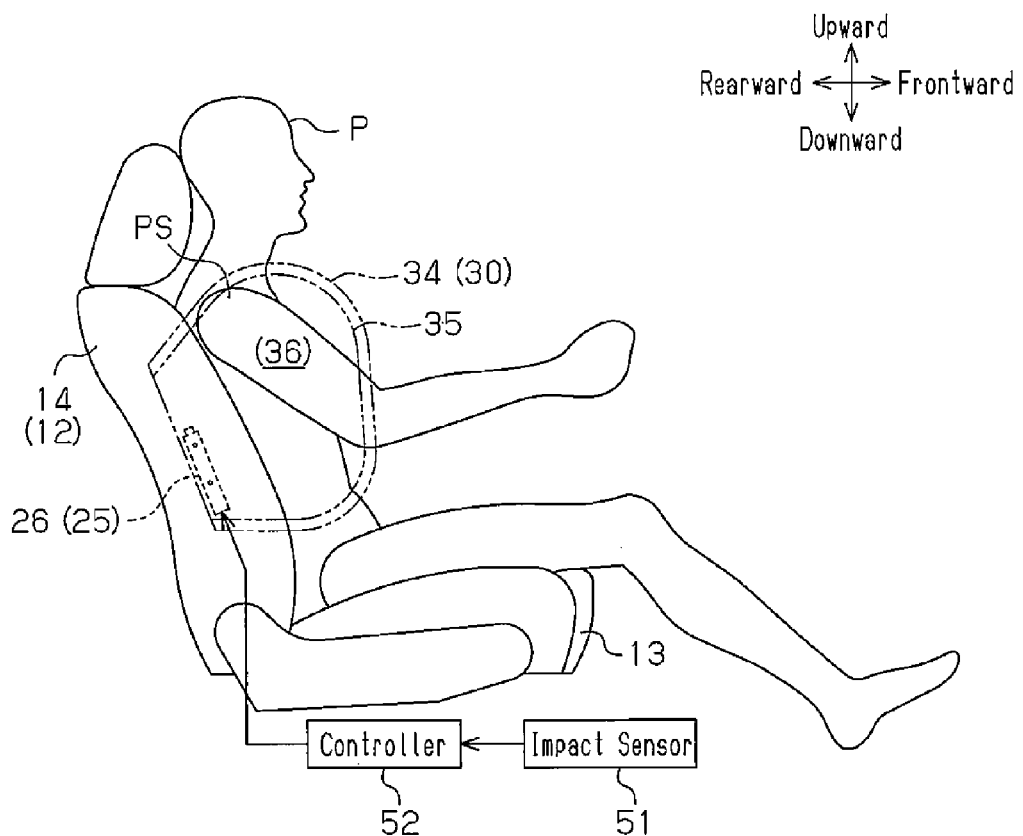
FIG. 1 is a side view of an automobile side airbag apparatus according to one embodiment, illustrating, together with an occupant, the apparatus installed in an automobile seat.
Figure 2:
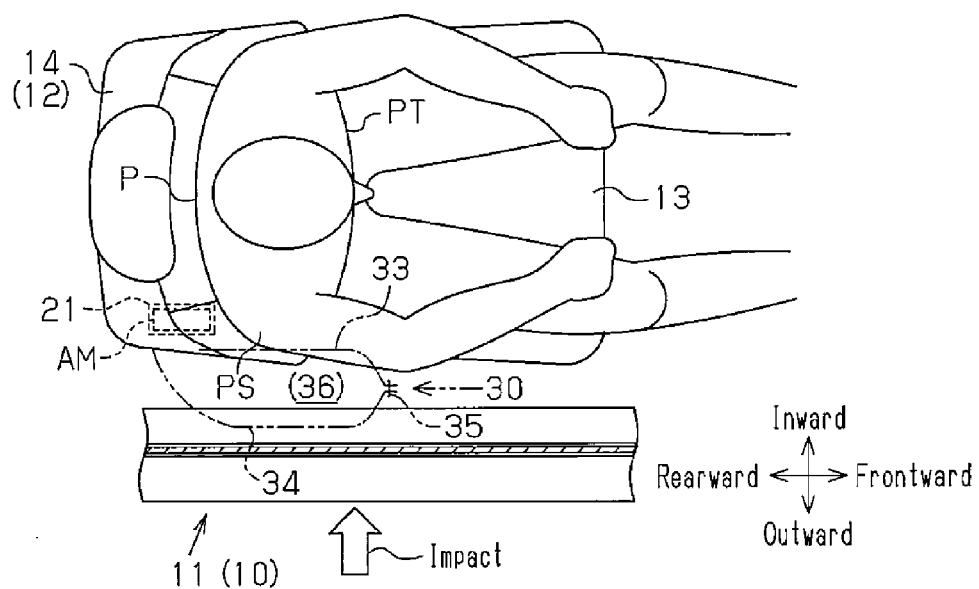
FIG. 2 is a cross-sectional plan view showing the positional relationship of the automobile seat, an airbag module, the occupant, and a body side portion.

As shown in FIGS. 1 and 2, an automobile seat 12 is arranged on the inner side of a body side portion 11 of an automobile 10. The body side portion 11 refers to an automobile component that is located at a side of the automobile 10. Doors and pillars correspond to the body side portion 11. For example, part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, a rear quarter, and the like.

The automobile seat 12 includes a seat cushion 13, a seat back 14, and a tilt adjusting mechanism (not shown). The seat back 14 extends obliquely rearward and upward at the rear end of the seat cushion 13. The tilt adjusting mechanism varies the inclination angle of the seat back 14. The automobile seat 12 is arranged in the automobile 10 such that the seat back 14 faces forward. The widthwise direction of the thus arranged automobile seat 12 matches with the direction of the automobile width.

The internal structure of a side portion of the seat back 14 on the outer side will now be described.

As shown in FIG. 5A, a seat frame including a side frame portion 15 is located in the seat back 14 and forms the frame of the seat back 14. The side frame portion 15 is located at the outer side portion in the seat back 14. The side frame portion 15 is formed by bending a metal plate. A seat pad 16 formed of elastic material is located in front of the seat frame including the side frame portion 15, and a hard back board 17 formed of plastic is located behind the seat frame. Although the seat pad 16 is coated with a cover, the cover is not illustrated in FIGS. 5A and 5B.

In the seat pad 16, a storage portion 21 is provided in the outer side portion of the side frame portion 15. The storage portion 21 accommodates an airbag module AM. The airbag module AM forms a main part of the side airbag apparatus.

The seat pad 16 has a slit 22, which is formed to extend from the outer front corner of the storage portion 21. The slit 22 extends diagonally forward and toward the exterior. A part between a front corner 16c of the seat pad 16 and the slit 22 (a part surrounded by the long dashed double-short dashed line in FIG. 5) forms a breakable portion 23. The breakable portion 23 is designed to be broken by an airbag 30, which will be discussed below.

The airbag module AM includes a gas generator 25 and an airbag 30. The gas generator 25 and the airbag 30 are main components of the airbag module AM. Each of these components will now be described.

<Gas Generator 25>

Figure 6:
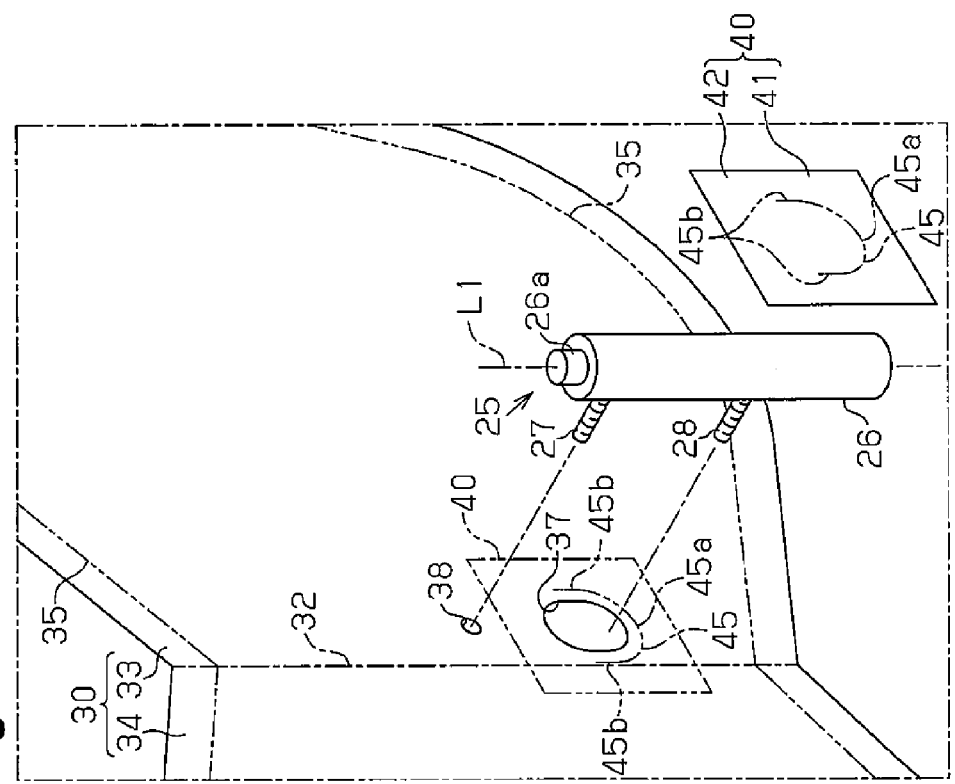
FIG. 6 is an exploded partial perspective view illustrating the components of the airbag module.

As shown in FIGS. 5A and 6, the main part of the gas generator 25 is formed by an inflator 26. The inflator 26 is has an elongated and, more specifically, substantially columnar shape. The inflator 26 stores a gas generating agent (not shown) that generates inflation gas. The inflator 26 has a small diameter gas outlet 26a at the distal end (the upper end in FIG. 6). Although not shown, gas discharging holes are formed in the outer circumferential surface of the gas outlet 26a. A harness (not shown) is connected to the proximal end (lower end) of the inflator 26. The harness forms input wiring for operation signals to the inflator 26.

The inflator 26, which uses a gas generating agent, is generally referred to as the pyrotechnic type. The inflator 26 may be a hybrid type instead of the pyrotechnic type. The hybrid type inflator discharges inflation gas by breaking a partition of a cylinder with, for example, explosives. The cylinder is filled with high-pressure inflation gas.

Figure 7:
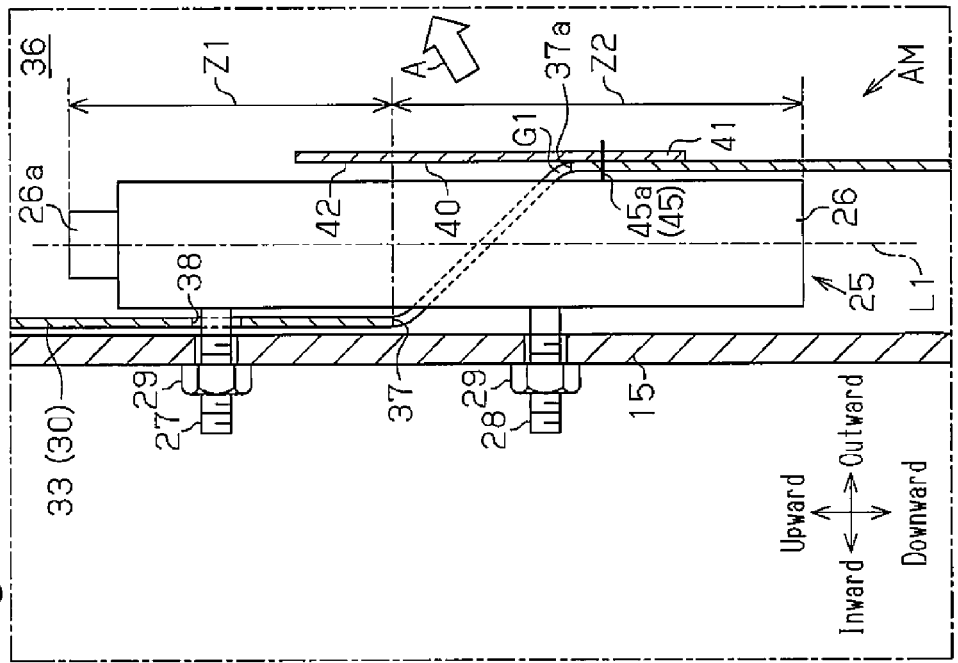
FIG. 7 is a partial cross-sectional view illustrating a state in which the gas generator is mounted on the side frame portion together with the airbag.

As shown in FIG. 7, the section of the inflator 26 from the longitudinally middle portion to the distal end of the gas outlet 26a is defined as an insertion section Z1. The insertion section Z1 is located inside the airbag 30. The section from the longitudinally middle portion of the inflator 26 to the proximal end is defined as an exposed section Z2. The exposed section Z2 is located outside the airbag 30. The exposed section Z2 will be described in detail below.

The inflator 26 has an outer circumferential surface. First and second bolts 27, 28 project from the outer circumferential surface of the inflator 26 in a direction perpendicular to an axis L1 of the inflator 26 at multiple positions (two positions in the present embodiment) separate from each other in the direction of the axis L1. The first bolt 27 located in the vicinity of the gas outlet 26a projects from the insertion section Z1. The first bolt 27 forms a mounting protrusion for mounting the inflator 26 to the side frame portion 15 together with the airbag 30. The first bolt 27 is inserted in the airbag 30. The second bolt 28 located apart from the gas outlet 26a projects from the exposed section Z2.

The first and second bolts 27, 28 may be directly or indirectly secured to the inflator 26. When directly secured to the inflator 26, the inflator 26 and the bolts 27, 28 form the gas generator 25. When the first and second bolts 27, 28 are indirectly secured to the inflator 26, for example, a band-like auxiliary member (not shown) may be attached to the outer circumference of the inflator 26, and the first and second bolts 27, 28 may be secured to the auxiliary member. In this case, the inflator 26, the bolts 27, 28, and the auxiliary member form the gas generator 25.

<Airbag 30>

FIG. 3A shows the airbag module AM in a state in which the airbag 30 is deployed in a planar form without charging the inflation gas (hereinafter, referred to as an "uninflated and deployed state") as viewed from the inner side of the automobile. FIG. 4A shows the airbag module AM in which the airbag 30 is cut at the center in the automobile widthwise direction to show the internal structure of the airbag module AM as viewed from the outer side of the automobile.

As shown in FIGS. 3A and 4A, the airbag 30 is formed by folding a single fabric piece (also referred to as a base fabric, or a fabric panel) along a folding line 32 to be overlapped in the automobile widthwise direction, and joining the overlapped parts. To distinguish the two overlapped parts of the airbag 30, the part located on the inner side is referred to as a fabric portion 33, and the part located on the outer side is referred to as a fabric portion 34 (see FIGS. 5A and 5B).

In the present embodiment, the fabric piece is folded such that the folding line 32 is located at the rear end of the airbag 30. However, the fabric piece may be folded such that the folding line 32 is located on any of the other ends of the airbag 30. The other ends include, for example, the front end, the upper end, and the lower end. The airbag 30 may also be formed of two fabric pieces divided along the folding line 32. In this case, the airbag 30 is formed by overlapping two fabric pieces in the automobile widthwise direction and joining the peripheral portions of the fabric pieces to each other. Furthermore, the airbag 30 may be formed of three or more fabric pieces.

The fabric portions 33, 34 are formed of material having high strength and flexibility so as to be easily folded. The material may be, for example, woven cloth formed of polyester threads or polyamide threads.

The fabric portions 33, 34 have peripheral portions, which include a peripheral joint portion 35. The fabric portions 33, 34 are joined at the peripheral joint portion 35. In the present embodiment, the peripheral joint portion 35 is formed by sewing (sewn with a sewing thread) part of the peripheral portions of the fabric portions 33, 34 except the rear end or the part in the vicinity of the folding line 32. A joint 45, which will be discussed below, is joined by sewing in the same manner.

Regarding sewing, two types of lines represent sewing portions in FIGS. 3, 4, 8, 9, 14, and 15. Referring to the peripheral joint portion 35 in FIG. 3A, the first type of line is a type of broken line including thick line segments of a certain length arranged at intervals. FIG. 3A shows the sewn part as viewed from the outer side or the inner side of the automobile. Referring to the peripheral joint portion 35 in FIG. 4A, the second type of line is a type of broken line including dots arranged at predetermined intervals. FIG. 4A shows the state of, for example, the sewing threads between the fabric portions 33, 34, which are to be sewn together. That is, FIG. 4A, in which the sewn part is represented by the second type of line, shows the structure along the cross-section that passes through the sewn portion.

The peripheral joint portion 35 may be formed by method other than sewing using the sewing threads, but may be formed by, for example, using an adhesive. In this respect, the same applies to the joint 45, which will be discussed below.

As shown in FIGS. 1 and 2, a space between the fabric portions 33, 34 and surrounded by the peripheral joint 35 forms an inflation portion 36. When the airbag 30 is deployed and inflated with the inflation gas on the side of part of the upper body of an occupant P (region from the thorax PT to the shoulder region PS), the inflation portion 36 restrains the above-mentioned region and protects it from an impact.

As shown in FIGS. 3B, 4B, 8, and 9, the lower section of the fabric portion 33 on the inner side of the automobile includes an insertion opening 37 that is open at a position close to the folding line 32. The insertion opening 37 is used to insert the insertion section Z1 of the gas generator 25 from the outside of the airbag 30. The insertion opening 37 is formed by an elongated hole having an elliptical shape. The ellipse is a track like shape that includes two semicircles, which have a certain radius and are arranged apart from each other, and two straight lines, which connect the ends of the two separated semicircles.

The insertion opening 37 has a first dimension M1 and a second dimension M2. The first dimension M1 is set longer than the second dimension M2. The first dimension M1 is in the insertion direction of the gas generator 25, and the second dimension M2 is in a direction perpendicular to the insertion direction of the generator 25. The second dimension M2 is set to a value slightly greater than the outer diameter of the inflator 26.

As shown in FIGS. 10A and 10B, the first bolt 27 includes a base section 27a. When the gas generator 25 is inserted in the insertion opening 37, the base section 27a abuts against the front end of the insertion opening 37 in the insertion direction of the gas generator 25 from the inner side of the airbag 30. The base section 27a serves as a fulcrum when the gas generator 25 is rotated during the insertion of the gas generator 25. The first dimension M1 of the insertion opening 37 is set to a length that permits the gas outlet 26a to be inserted in the insertion opening 37 when the gas generator 25 is rotated with the base section 27a serving as the fulcrum.

Figure 8:
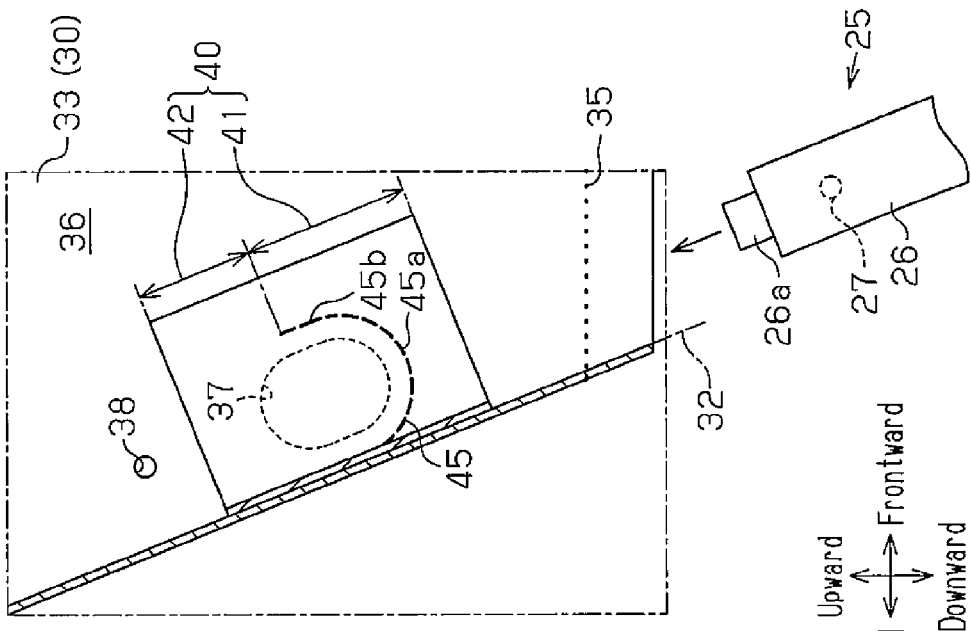
FIG. 8 is a partial side view illustrating the airbag before the gas generator is mounted in a state as viewed from the inner side of the automobile.
Figure 9:
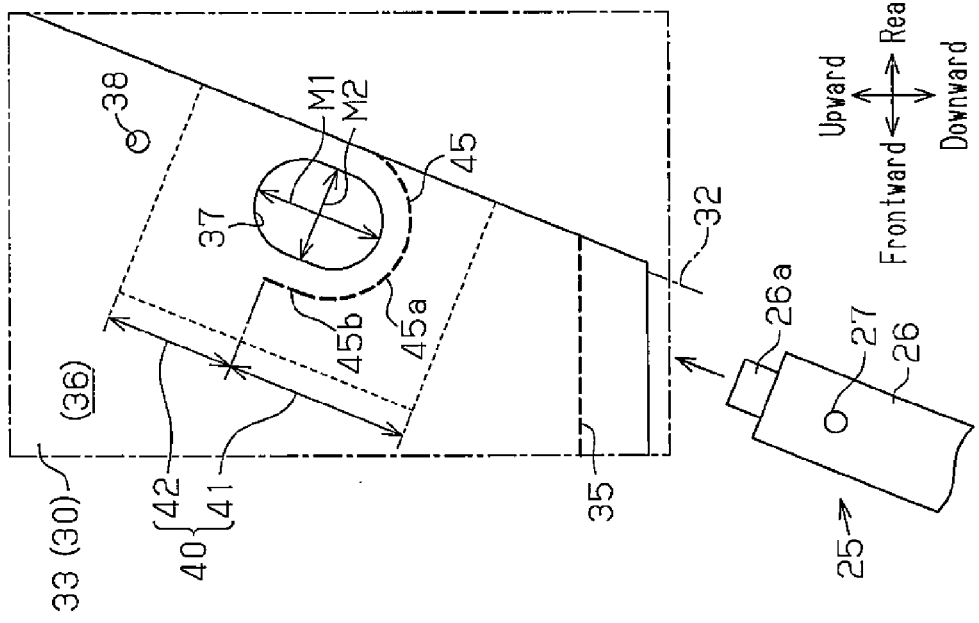
FIG. 9 is a partial cross-sectional side view illustrating the internal structure of the airbag before the gas generator is mounted in a state as viewed from the outer side of the automobile.

As shown in FIGS. 8 and 9, the fabric portion 33 on the inner side of the automobile includes a hole 38 that is open at a position substantially above the insertion opening 37. The hole 38 is used to insert the first bolt 27 of the gas generator 25.

As shown in FIG. 7, the insertion section Z1 of the gas generator 25 is inserted inside the airbag 30 through the insertion opening 37 and is arranged along the inner wall surface of the fabric portion 33 of the airbag 30. The exposed section Z2 of the gas generator 25 is located outside the airbag 30 and along the outer wall surface of the fabric portion 33 of the airbag 30. The first bolt 27 of the gas generator 25 is inserted in the hole 38 from inside the airbag 30 to outside the airbag 30. The second bolt 28 of the gas generator 25 is located outside the airbag 30 without being inserted in the airbag 30.

As shown in FIGS. 6 to 8, a lid sheet 40 is located in the airbag 30. The lid sheet 40 is formed of the same material as the fabric portions 33, 34. The lid sheet 40 includes a main body sheet portion 41 and an expansion portion 42, which is located forward of the main body sheet portion 41 in the insertion direction of the gas generator 25 and extends forward in the insertion direction. The main body sheet portion 41 functions to close the gap G1 between an inner edge 37a of the insertion opening 37 and the gas generator 25 from the position inward of the insertion section Z1. The expansion portion 42 contacts part of the gas generator 25 forward of the gap G1 of the insertion opening 37 in the insertion direction and the insertion section Z1 of the gas generator 25 from the inside and functions to more effectively restrain leakage of the inflation gas.

The main body sheet portion 41 includes the joint 45 located along the rear portion of the insertion opening 37 in the insertion direction of the gas generator 25. The main body sheet portion 41 is joined to the airbag 30 with the joint 45. The joint 45 is formed by a curved portion 45a and a pair of straight portions 45b. The curved portion 45a is semicircular and surrounds the rear portion of the insertion opening 37 in the insertion direction of the gas generator 25. The pair of straight portions 45b extends forward from both ends of the curved portion 45a in the insertion direction in a state in which the straight portions 45b sandwich the insertion opening 37. In the present embodiment, the front ends of the straight portions 45b in the insertion direction are located rearward of the front end of the insertion opening 37, but may be located beside or forward of the front end of the insertion opening 37. Furthermore, the expansion portion 42 is not joined to the airbag 30.

The airbag module AM is made compact, or is brought into a storage form, as shown in FIG. 5A by folding the airbag 30 in the uninflated and deployed state as shown in FIGS. 3A and 4A. The airbag module AM is folded in this manner in order that it is suitable for being accommodated in the storage portion 21, which has a limited size in the seat back 14. The airbag module AM with the folded airbag 30 is held in the storage form by a holder such as a binding tape (not shown).

As shown in FIG. 5A, the airbag module AM in the storage form is located in the storage portion 21 in a state in which the gas generator 25 is located on the rear side and most part of the airbag 30 is located on the front side. As shown in FIG. 7, the first bolt 27 protrudes from the insertion section Z1 of the inflator 26 and is inserted in the hole 38 of the airbag 30. The second bolt 28 is located outside the airbag 30. The first bolt 27 and the second bolt 28 are inserted in the side frame portion 15 and are fastened with nuts 29. The fastening secures the gas generator 25 to the side frame portion 15 together with the airbag 30.

As shown in FIG. 1, the side airbag apparatus includes an impact sensor 51 and a controller 52 in addition to the above-described airbag module AM. The impact sensor 51 is configured by, for example, an acceleration sensor. The impact sensor 51 is provided on the body side portion 11 of the automobile 10 to detect an impact applied from the outside to the body side portion 11. The controller 52 controls the operation of the inflator 26 based on a detection signal from the impact sensor 51.

Furthermore, the automobile 10 is equipped with a seat belt apparatus for restraining the occupant P seated on the automobile seat 12. However, illustration of the seat belt apparatus is omitted in FIG. 1.

The airbag 30 takes the folded form before being attached to the gas generator 25 during the manufacturing process. The form is defined as a transitional form to distinguish from the storage form. The airbag 30 in the transitional form is set as a form suitable for transport of the side airbag apparatus between two different manufacturing bases, which are a first manufacturing base and a second manufacturing base.

Operation of the side airbag apparatus according to the above-described embodiment will now be described.

First, the procedure for mounting the gas generator 25 to the airbag 30 in the transitional form will be described with reference to FIGS. 7, 10, and 11.

Referring to FIG. 7, when the gas generator 25 is mounted, the insertion section Z1 of the gas generator 25 is inserted into the airbag 30 through the insertion opening 37. The section that is inserted includes not only the inflator 26 but also the first bolt 27. The first bolt 27 protrudes in a direction perpendicular to the axis L1. At the section where the first bolt 27 is secured, the dimension of the gas generator 25 in the direction perpendicular to the axis L1 is increased by the dimension of the first bolt 27.

Referring to FIG. 8, in the present embodiment, the first dimension M1 of the insertion opening 37 in the insertion direction of the gas generator 25 is longer than the second dimension M2 in a direction perpendicular to the insertion direction. The base section 27a of the first bolt 27 is inserted to abut against the front end of the insertion opening 37 in the insertion direction of the gas generator 25 from inside the airbag 30. The base section 27a serves as the fulcrum when the gas generator 25 is rotated. The first dimension M1 of the insertion opening 37 is set to a length that permits the gas outlet 26a to be inserted in the insertion opening 37 when the gas generator 25 is rotated.

As shown in FIG. 10A, for example, in a state in which the first and second bolts 27, 28 project upward from the inflator 26, and the gas outlet 26a is located to face the airbag 30, the gas generator 25 is tilted to be lowered toward the airbag 30. In this state, the gas outlet 26a is brought closer to the insertion opening 37, and the first bolt 27 is inserted in the insertion opening 37. As shown in FIG. 10B, the base section 27a of the first bolt 27 is brought into contact with the front end, or the upper end, of the insertion opening 37 in the insertion direction of the gas generator 25 from inside the airbag 30. In this state, the gas generator 25 is rotated counterclockwise in FIG. 10B with the base section 27a serving as the fulcrum. The rotation allows part of the insertion section Z1 of the gas generator 25, that is, the distal end to be inserted in the airbag 30 through the insertion opening 37. At this time, the gas generator 25 hardly moves in a direction perpendicular to the axis L1.

Subsequently, with the distal end of the first bolt 27 serving as the fulcrum, the gas generator 25 is rotated counterclockwise as shown by the arrow in FIG. 10B. Accordingly, as shown in FIG. 11A, the distal end of the insertion section Z1 of the gas generator 25 is inserted in the airbag 30 through the insertion opening 37. The bolt 27 contacts the fabric portion 33 of the airbag 30 at the distal end and is inclined with respect to the fabric portion 33.

Next, in a state in which the distal end of the bolt 27 contacts the fabric portion 33, the gas generator 25 is moved substantially upward, that is, moved parallel toward the hole 38 as shown by the arrow in FIG. 11A. As shown in FIG. 11B, when the inflator 26 contacts the inner edge 37a (see FIG. 7) at the distal end of the insertion opening 37 in the insertion direction of the gas generator 25, the gas generator 25 is rotated counterclockwise in FIG. 11B with the contact portion of the inflator 26 serving as the fulcrum. The first bolt 27 close to the gas outlet 26a is then inserted in the hole 38, and the gas generator 25 is secured to the airbag 30 as shown in FIG. 11C. The second bolt 28 is located outside the airbag 30 without being inserted in the airbag 30.

As shown in FIG. 7, the insertion section Z1 of the gas generator 25 is located in the airbag 30 close to the inner wall surface of the fabric portion 33. The exposed section Z2 of the gas generator 25 is located outside the airbag 30 close to the outer wall surface of the fabric portion 33.

The procedure described above is only an example, and the gas generator 25 may be mounted to the airbag 30 in the transitional form by different procedures.

Hereafter, operation of the side airbag apparatus of the present embodiment will be described.

The impact sensor 51 detects an impact applied on the body side portion 11 from the side. When the impact sensor 51 does not detect any impact, the controller 52 does not output an activation signal to the inflator 26 to activate the inflator 26. Thus, the inflating gas is not discharged from the inflator 26. Referring to FIG. 5A, the airbag 30 remains accommodated in the storage portion 21 with the gas generator 25 in the storage form.

In contrast, when the impact sensor 51 detects that an impact of a magnitude greater than or equal to a predetermined value has been applied to the body side portion 11 due to a side collision or the like while the automobile 10 is running, the controller 52, based on the detection signal, sends an activation signal to the inflator 26 to activate the inflator 26. In response to the activation signal, the inflator 26 discharges inflation gas through the gas outlet 26a.

When the inflation gas is supplied to the airbag 30 in the storage form, the inflation portion 36 of the airbag 30 starts to inflate. The inflation causes the airbag 30 to be unfolded and deployed. Referring to FIG. 5A, the deployed and inflated airbag 30 presses the seat pad 16 of the seat back 14 to be broken at the breakable portion 23. As shown in FIG. 5B, the airbag 30 is projected forward from the seat back 14 through the broken portion with a rear part of the airbag 30 remaining in the storage portion 21.

When the inflation gas continues to be supplied to the airbag 30, the airbag 30 is inflated while being unfolded and deployed forward between the body side portion 11 and the upper body of the occupant P seated on the automobile seat 12, that is, the region from the thorax PT to the shoulder region PS as shown by the long dashed double-short dashed line in FIG. 2.

The thus deployed and inflated airbag 30 is located between the upper body of the occupant P and the body side portion 11, which bulges into the passenger compartment. The airbag 30 pushes the upper body inward and restrains the upper body. The side impact transmitted to the upper body through the body side portion 11 is reduced by the airbag main 30 and the upper body is protected.

When the airbag 30 is deployed and inflated as described above, the airbag 30 is pulled, for example, in a direction shown by arrow A in FIG. 7, and the insertion opening 37 is deformed to increase the gap G1 between the inner edge 37a of the insertion opening 37 and the gas generator 25.

In the present embodiment, the lid sheet 40 includes the main body sheet portion 41, which has the joint 45. The joint 45 joins the airbag 30 and the main body sheet portion 41 together. Furthermore, the joint 45 includes the curved portion 45a and the straight portions 45b. The section surrounded by the curved portion 45a and the straight portions 45b restricts the insertion opening 37 from being deformed. Thus, the gap G1 is unlikely to increase.

At this time, the main body sheet portion 41 also closes the gap G1 from the position inward of the insertion section Z1. Furthermore, the pressure of inflation gas that acts from inside the airbag 30 toward the outside of the airbag 30, that is, the internal pressure is applied to the main body sheet portion 41. As a result, the lid sheet 40 is pushed toward the gas generator 25 and the airbag 30. Thus, the inflation gas in the airbag 30 is unlikely to leak through the gap G1 to the outside the airbag 30.

In addition, the expansion portion 42 of the lid sheet 40 contacts part of the gas generator 25 forward of the gap G1 of the insertion opening 37 in the insertion direction of the gas generator 25 and the insertion section Z1 of the gas generator 25 from the inside. This further restrains leakage of the inflation gas through the gap G1.

Furthermore, when the airbag 30 is deployed and inflated with the inflation gas, pressure of inflation gas in various directions such as downward is applied to the expansion portion 42 in addition to the pressure of the inflation gas toward the outside.

Since the expansion portion 42 and the airbag 30 are not joined by the joint 45, the expansion portion 42 is easily moved and deformed as compared to a case in which the expansion portion 42 is joined to the airbag 30. Thus, the expansion portion 42 is deformed, that is, rumpled by the inflation gas and is brought into contact with the insertion section Z1 of the gas generator 25 and the airbag 30. This is also effective in restraining the leakage of the inflation gas.

The second dimension M2 of the insertion opening 37 is smaller than the first dimension M1. Furthermore, the second dimension M2 is set to the minimum dimension that permits the gas generator 25 to pass through. Since the gap G1 is minimized in a direction perpendicular to the insertion direction of the gas generator 25, the inflation gas is more unlikely to leak through the gap G1.

The present embodiment as described above achieves the following advantages.

(1) As shown in FIG. 7, the lid sheet 40 is located inside the airbag 30 and is joined to the airbag 30 with the joint 45 provided along the rear portion of the insertion opening 37 in the insertion direction of the gas generator 25. The lid sheet 40 is formed to close the gap G1 between the inner edge 37a of the insertion opening 37 and the gas generator 25 from the position inward of the insertion section Z1 of the gas generator 25.

Thus, the lid sheet 40 further restrains leakage of the inflation gas through the insertion portion of the airbag 30 for the gas generator 25, that is, the gap G1. As a result, the inflation gas from the inflator 26 is effectively used for deploying and inflating the airbag 30.

(2) As shown in FIG. 7, the first bolt 27 is used to attach the gas generator 25 to the side frame portion 15 of the automobile 10. The first bolt 27 is provided at the insertion section Z1 of the gas generator 25 as a mounting protrusion, which protrudes in a direction perpendicular to the axis L1 of the gas generator 25. The first bolt 27 is inserted in the hole 38 formed in the airbag 30.

The insertion of the first bolt 27 in the hole 38 secures the gas generator 25 to the airbag 30. Also, fastening the first bolt 27 to the side frame portion 15 with the associated nut 29 secures the gas generator 25 to the side frame portion 15 together with the airbag 30.

(3) As shown in FIG. 8, the insertion opening 37 is an elongated hole. The first dimension M1 in the insertion direction of the gas generator 25 is set longer than the second dimension M2 in a direction perpendicular to the insertion direction. Thus, the insertion section Z1 of the gas generator 25 is more easily inserted inside the airbag 30 through the insertion opening 37, and the insertion operation is improved.

In particular, in the present embodiment, the insertion section Z1 of the gas generator 25 includes the first bolt 27, which protrudes in a direction perpendicular to the axis L1. The first bolt 27 also needs to be passed through the insertion opening 37. Since the insertion opening 37 is an elongated hole that extends in the insertion direction, the insertion section Z1 including the first bolt 27 is easily inserted in the insertion opening 37.

(4) As shown in FIG. 8, the second dimension M2 of the insertion opening 37 is set to the minimum dimension that permits the inflator 26 to pass through. Thus, the gap G1 formed between the insertion opening 37 and the gas generator 25 in a direction perpendicular to the insertion direction is minimized. As compared to a case in which the insertion opening 37 is a round hole having a diameter that is the same as the first dimension M1, leakage of the inflation gas in the airbag 30 through the gap G1 is restrained.

(5) As shown in FIGS. 10 and 11, the first bolt 27 includes the base section 27a, which is inserted to abut against the front end of the insertion opening 37 in the insertion direction of the gas generator 25 from inside the airbag 30. The base section 27a serves as the fulcrum when the gas generator 25 is rotated. The first dimension M1 of the insertion opening 37 is set to a length that permits the gas outlet 26a to be inserted in the insertion opening 37 when the gas generator 25 is rotated.

Thus, the insertion section Z1 of the gas generator 25 is relatively easily inserted in the airbag 30 through the insertion opening 37 by rotating the gas generator 25 with the base section 27a of the first bolt 27 serving as the fulcrum.

(6) As shown in FIGS. 8 and 9, part of the lid sheet 40 that closes the gap G1 and is joined to the airbag 30 with the joint 45 is defined as the main body sheet portion 41. The expansion portion 42 extends from the front end of the main body sheet portion 41 in the insertion direction of the gas generator 25.

Thus, as compared to a lid sheet without the expansion portion 42, leakage of the inflation gas through the gap G1 around the gas generator 25 is further restrained.

(7) As shown in FIGS. 8 and 9, the expansion portion 42 is not joined to the airbag 30.

Thus, since the expansion portion 42 moves more easily and is brought into contact with the insertion section Z1 of the gas generator 25 in a state where the expansion portion 42 is deformed by the inflation gas, leakage of the inflation gas is further restrained.

The above-described embodiment may be modified as follows.

<Regarding Gas Generator 25>

Figure 12A:
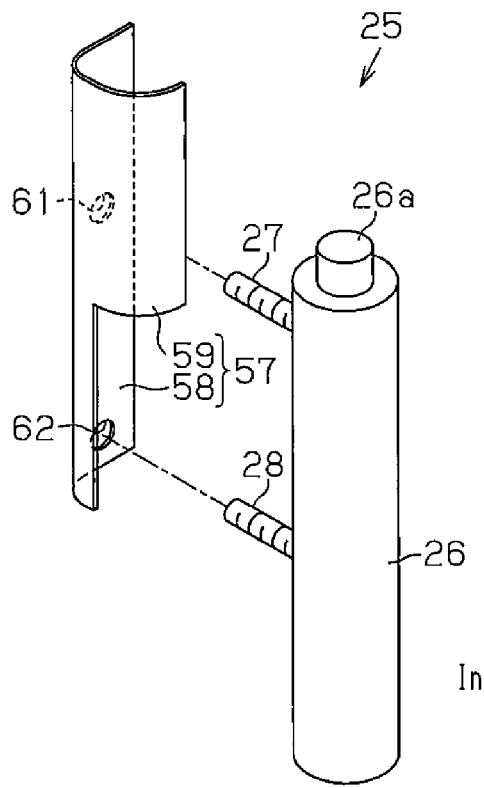
FIG. 12A is an exploded perspective view illustrating a modification of the gas generator in a state before a retainer is attached to the inflator.
Figure 12B:
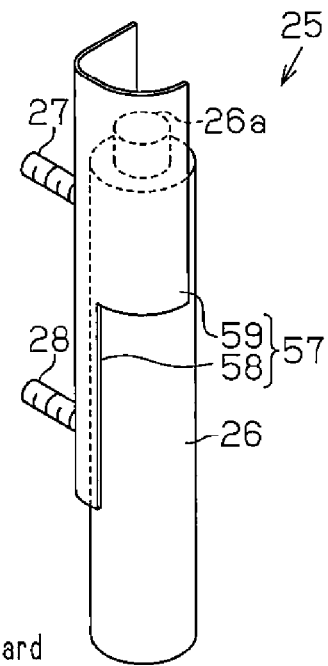
FIG. 12B is a perspective view illustrating the modification of the gas generator in a state in which the retainer is attached to the inflator.
Figure 13:
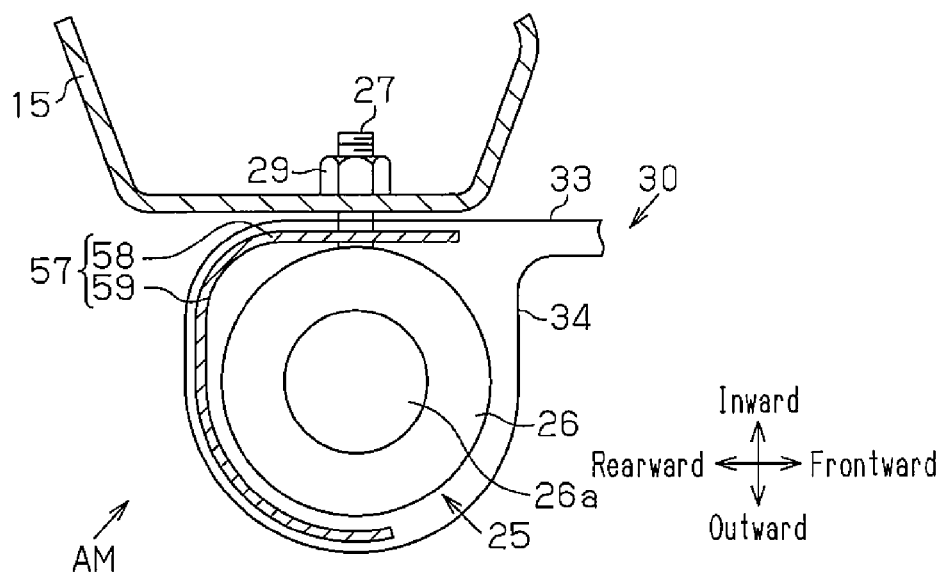
FIG. 13 is a partial cross-sectional plan view illustrating a state in which the gas generator of FIG. 12B is mounted on the side frame portion together with the airbag.

As shown in FIGS. 12A, 12B, and 13, the gas generator 25 may be formed by mounting a retainer 57 to the inflator 26. In FIGS. 12A, 12B, and 13, like or the same reference numerals are given to those components that are like or the same as the corresponding components of the above-described embodiment.

The retainer 57 is formed by bending a piece of material having thermal resistance, for example, a plate material such as a metal plate. More specifically, the retainer 57 includes a base 58 and an extended portion 59. The base 58 extends in a vertical direction between the inflator 26 and the airbag 30. The extended portion 59 extends from the upper section of the base 58 to the outer side and is bent to surround the rear half of the gas outlet 26a. Two bolt holes 61, 62 are formed in parts of the base 58 separate from each other in the vertical direction. The first and second bolts 27, 28 of the inflator 26 are inserted in the corresponding bolt holes 61, 62 of the base 58, and the rear half of the inflator 26 and the gas outlet 26a are surrounded by the extended portion 59. In this state, the inflator 26 is secured to the retainer 57.

When the gas generator 25 formed as described above is used, the extended portion 59 of the retainer 57 is located between the rear part of the fabric portion 33 of the airbag 30 and the gas outlet 26a. When the side airbag apparatus is activated, the extended portion 59 restrains the inflation gas from directly contacting the rear part of the fabric portion 33 of the airbag 30 by receiving the inflation gas discharged rearward from the gas outlet 26a.

When the retainer 57 is used as described above, the first and second bolts 27, 28 may be secured to the retainer 57 instead of the inflator 26. In this case, the inflator 26 is secured to the retainer 57 by other securing methods such as crimping.

Any member that secures the inflator 26 to the vehicle may be employed as the mounting protrusion instead of the first bolt 27.

The mounting protrusion may be provided at multiple positions in the direction of the axis L1 of the inflator 26. When the mounting protrusions are provided at multiple positions, all the mounting protrusions may be secured to the side frame portion 15 in the same manner such as by fastening with bolts and nuts or in different manners.

<Regarding Inflation Portion 36>

The substantially entire airbag 30 may be formed of the inflation portion 36 as in the above-illustrated embodiment, but may also include a non-inflation portion, which is neither supplied with inflation gas nor inflated.

<Regarding Insertion Opening 37>

Figure 14:
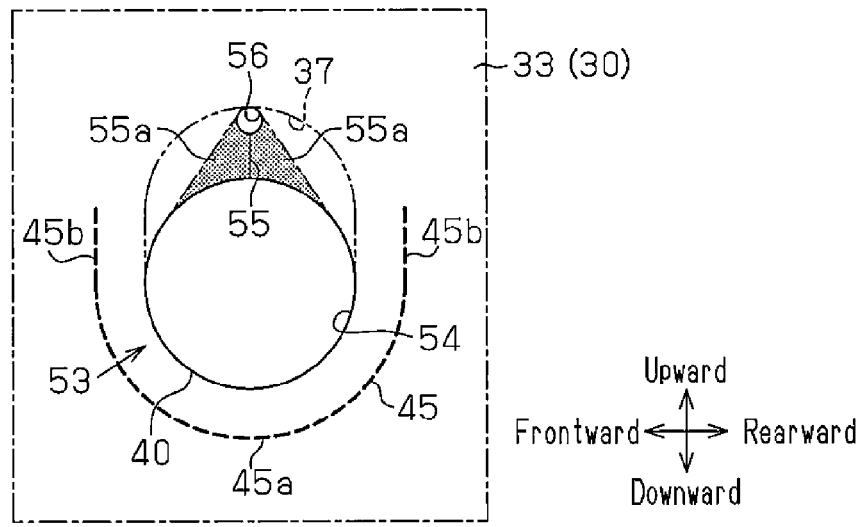
FIG. 14 is a partial front view illustrating a modification of an insertion opening of the airbag.

The shape of the insertion opening may be modified to a shape different from the insertion opening 37, which is an ellipse. FIG. 14 is an example of the insertion opening.

According to the modification, a hole 54, a slit 55, and a small hole 56 are formed in the inner side fabric portion 33 of the airbag 30. The hole 54 is a round hole having a slightly larger diameter than the outer diameter of the inflator 26. The slit 55 extends from the hole 54 forward of the gas generator 25 in the insertion direction, that is, upward in FIG. 14 and is connected to the small hole 56. The small hole 56 is formed at a position forward of the hole 54 in the insertion direction and is a round hole having a smaller diameter than the hole 54. The hole 54, the slit 55, and the small hole 56 form an insertion opening 53.

In FIG. 14, like or the same reference numerals are given to those components that are like or the same as the corresponding components of the above-described embodiment.

In this case, when inserting the insertion section Z1 in the airbag 30 through the insertion opening 53, sections 55a surrounded by the slit 55, the common tangents of the hole 54 and the small hole 56, and the inner edge of the hole 54, that is, two sections with dots in FIG. 14 are deformed to open so that the hole 54 expands forward in the insertion direction. Thus, the gas generator 25 is easily inserted as compared to a case in which the insertion opening 53 is formed by only the hole 54.

When force is applied to the fabric portion 33 as the gas generator 25 is inserted, the small hole 56 restrains the slit 55 from becoming longer than the initial length.

The opening of the thus expanded insertion opening 53 is smaller than the opening of the insertion opening 37 of the above-described embodiment formed by the elongated hole, which is shown by the long dashed double-short dashed line in FIG. 14. Thus, the gap created between the gas generator 25 and the inner edge of the insertion opening 53 is smaller than the gap created in the case with the insertion opening 37 formed by the elongated hole. This reduces the amount of inflation gas that leaks through the gap.

The hole 54 may be modified to have a shape different from a round hole. The small hole 56 may be omitted as required.

<Regarding Lid Sheet 40>

The lid sheet 40 may be formed by only the main body sheet portion 41 omitting the expansion portion 42.

The expansion portion 42 may be joined to the airbag 30 with the joint 45 like the main body sheet portion 41.

<Regarding Joint 45>

The joint 45 may be modified to a shape different from the shape in the above-described embodiment, which is the combination of the curved portion 45a and the pair of straight portions 45b.

<Regarding Storage Portion of Airbag Module AM>

Instead of the seat back 14 of the automobile seat 12, a part that corresponds to the storage portion 21 may be located in the body side portion 11 to accommodate the airbag module AM.

<Types of Applicable Airbag Apparatus>

The above described embodiment is applied to an airbag apparatus that uses the elongated gas generator 25. The present invention be applied to any airbag apparatuses other than a side airbag apparatus as long as part of the gas generator 25 in the longitudinal direction is located in the airbag 30 and the remaining part is located outside the airbag 30.

Figure 15:
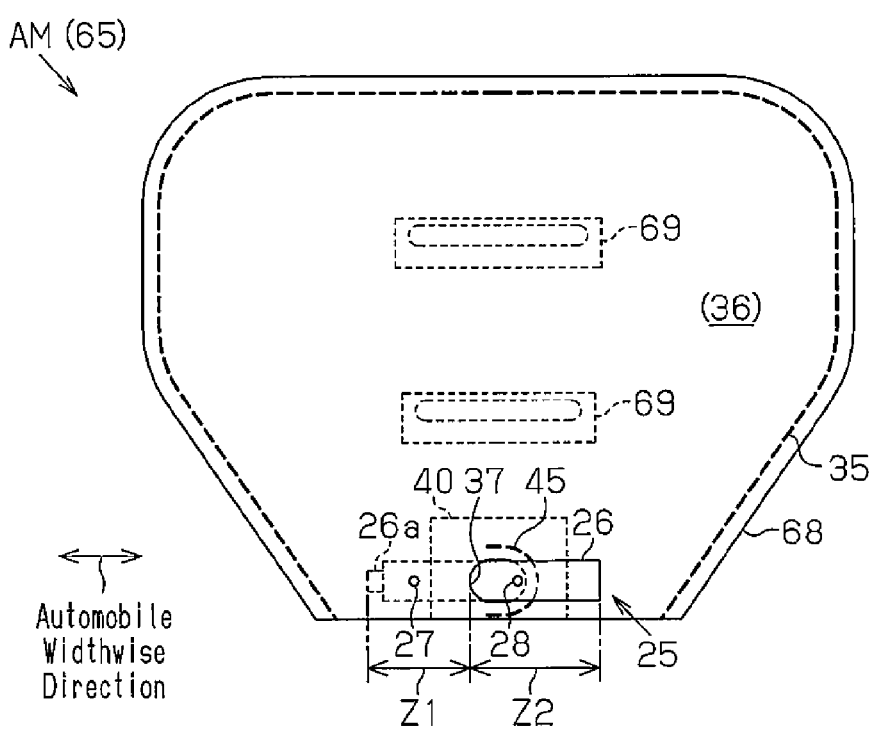
FIG. 15 is a view illustrating an example in which the airbag apparatus is applied to a knee protecting airbag apparatus, and is a front view illustrating the airbag module in a state in which the airbag is uninflated and deployed.

One example of such airbags is an airbag apparatus for protecting knees shown in FIG. 15, that is, a knee airbag apparatus. This type of the airbag apparatus protects the region from the shins to the knees of an occupant by expanding an airbag 68 at the lower front of the legs of the occupant seated on the automobile seat (not shown). Furthermore, this type of the airbag apparatus is mounted below the steering column or in the instrument panel at the lower front of the occupant in the front passenger seat.

In FIG. 15, the airbag 68 is shown in the uninflated and deployed state. The sections 69 in FIG. 15 are members that are located inside the airbag 68, partition the inflation portion 36, and restrict the inflation thickness of the inflation portion 36, that is, tethers.

When the impact sensor detects that an impact is applied from the front of the automobile due to, for example, a frontal collision, the inflation portion 36 of the airbag 68 starts to inflate with the inflation gas from the gas generator 25 and is inflated and deployed between, for example, the steering column and the legs of the occupant.

In the case with the knee protecting airbag apparatus also, the insertion opening 37 may be formed in the airbag 68. In this case, the insertion section Z1 of the gas generator 25 is inserted inside the airbag 68 through the insertion opening 37 and is arranged along the inner wall surface of the airbag 68, and the exposed section Z2 is arranged outside the airbag 68 and along the outer wall surface of the airbag 68. The lid sheet 40 is located in the airbag 68 in the same manner as the above-described embodiment. The lid sheet 40 may be joined to the airbag 68 with the joint 45. This type of the airbag apparatus also provides the same advantages as the above-described embodiment.

The airbag apparatus is also applicable to a curtain shield airbag apparatus. The airbag of such an airbag apparatus is stored in the roof in the vicinity of a side door. This type of the airbag apparatus is deployed and inflated between the head portion of an occupant and a door window in response to an impact from the outer side of the automobile due to a side collision.

<Other Modifications>

The part of the upper body of the occupant P to be protected by the side airbag apparatus may be different from that in the above-illustrated embodiment.

The present invention may be applied to a side airbag apparatus of an automobile in which a seat 12 that faces in a direction other than the forward direction, for example, sideways. In this case, when an impact is applied to a side of the automobile seat 12 (in the front-rear direction of the automobile), the side airbag apparatus protects an occupant P from the impact.

Automobiles to which the airbag apparatus according to the present invention is applied include various industrial vehicles in addition to private cars.

The above-described airbag apparatus may also be applied to an airbag apparatus installed in seats in vehicles other than automobiles, including aircraft and ships.

The invention claimed is:

1. An airbag apparatus comprising a gas generator and an airbag, wherein
   the gas generator is elongated and includes a gas outlet at a distal end thereof,
   the airbag is deployed and inflated by inflation gas discharged from the gas outlet,
   the airbag includes an insertion opening for the gas generator,
   a section of the gas generator from a longitudinally middle portion to the gas outlet is defined as an insertion section,
   the insertion section is inserted in the airbag through the insertion opening and is arranged along an inner wall surface of the airbag,
   the gas generator has a proximal end located opposite from the gas outlet,
   a section from the middle portion to the proximal end is located outside the airbag and along an outer wall surface of the airbag,
   the airbag includes a lid sheet arranged inside the airbag,
   a gap is defined between the gas generator and an inner edge of the insertion opening,
   the lid sheet closes the gap from a position inward of the insertion section,
   the lid sheet includes a joint,
   the joint is located along a rear portion of the insertion opening in an insertion direction of the gas generator, and
   the lid sheet is joined to the airbag with the joint.

2. The airbag apparatus according to claim 1, wherein
   the insertion section of the gas generator includes a mounting protrusion for mounting the gas generator on a vehicle,
   the mounting protrusion projects in a direction perpendicular to an axis of the gas generator, the airbag has a hole located at a position away from the insertion opening, and the mounting protrusion is inserted in the hole.

3. The airbag apparatus according to claim 2, wherein the insertion opening is an elongated hole, and the dimension of the elongated hole in the insertion direction of the gas generator is longer than the dimension of the elongated hole in a direction perpendicular to the insertion direction.

4. The airbag apparatus according to claim 3, wherein
the mounting protrusion includes a base section,
the base section is inserted to abut against a front end of the insertion opening in the insertion direction from inside the airbag,
the base section serves as a fulcrum when the gas generator is rotated, and
the dimension of the insertion opening in the insertion direction is set to a length that permits the gas outlet to be inserted in the insertion opening when the gas generator is rotated with the base section serving as the fulcrum.

5. The airbag apparatus according to claim 2, wherein
the insertion opening includes a hole and a slit,
the hole is formed in the airbag, and
the slit extends forward from the hole in the insertion direction of the gas generator.

6. The airbag apparatus according to claim 1, wherein
the lid sheet includes a main body sheet portion and an expansion portion,
the main body sheet portion closes the gap and is joined to the airbag with the joint, and
the expansion portion is located forward of the main body sheet portion in the insertion direction of the gas generator and extends forward in the insertion direction.

7. The airbag apparatus according to claim 6, wherein the extended portion and the airbag are separated from each other.

* * * * *